United States Patent
Schaefer et al.

(10) Patent No.: US 8,048,521 B2
(45) Date of Patent: Nov. 1, 2011

(54) MULTILAYER HEAT SEALANT STRUCTURES, PACKAGES AND METHODS OF MAKING THE SAME

(75) Inventors: Suzanne E. Schaefer, Appleton, WI (US); Robert J. Blemberg, Appleton, WI (US); Roger P. Genske, Neenah, WI (US)

(73) Assignee: Bemis Company, Inc., Oshkosh, WI (US)

( * ) Notice: Subject to any disclaimer, the term of this patent is extended or adjusted under 35 U.S.C. 154(b) by 740 days.

(21) Appl. No.: 11/871,459

(22) Filed: Oct. 12, 2007

(65) Prior Publication Data
US 2008/0057239 A1    Mar. 6, 2008

Related U.S. Application Data

(63) Continuation-in-part of application No. 10/664,491, filed on Sep. 17, 2003, now abandoned.

(51) Int. Cl.
*B32B 7/12* (2006.01)
*B32B 15/04* (2006.01)

(52) U.S. Cl. ........ 428/349; 428/343; 428/346; 428/347; 428/354; 428/515; 428/516; 428/523

(58) Field of Classification Search .................. 428/343, 428/346, 347, 349, 354, 515, 516, 523
See application file for complete search history.

(56) References Cited

U.S. PATENT DOCUMENTS

| | | | |
|---|---|---|---|
| 5,322,720 A | 6/1994 | McMurtrie |
| 5,885,707 A | 3/1999 | Kaschel et al. |
| 5,948,513 A | 9/1999 | Turnbull et al. |
| 6,013,353 A | 1/2000 | Touhsaent |
| 6,248,442 B1 | 6/2001 | Kong et al. |
| 6,265,055 B1 | 7/2001 | Simpson et al. |
| 6,299,968 B1 | 10/2001 | Karaoglu et al. |
| 6,299,985 B1 | 10/2001 | Zhang et al. |
| 6,844,078 B2 | 1/2005 | Su et al. |
| 7,279,206 B2 | 10/2007 | Schell et al. |
| 2002/0071922 A1 | 6/2002 | Bailey |
| 2002/0168512 A1 | 11/2002 | Eggers et al. |
| 2004/0166261 A1 | 8/2004 | Pocket et al. |
| 2008/0057239 A1 | 3/2008 | Schaefer et al. |

FOREIGN PATENT DOCUMENTS

| | | |
|---|---|---|
| CA | 2511768 | 6/2004 |
| DE | 20112691 U1 | 12/2008 |
| EP | 0572034 A2 | 12/1993 |
| EP | 1283108 A1 | 2/2003 |
| WO | 0145934 A1 | 6/2001 |

OTHER PUBLICATIONS

European Supplementary Search Report for corresponding European Application 04784327 dated Feb. 10, 2011.
Canadian Office Action for corresponding Canadian Application 2,539,389 dated Nov. 23, 2010.

*Primary Examiner* — Michael C Miggins
(74) *Attorney, Agent, or Firm* — Banner & Witcoff, Ltd.

(57) ABSTRACT

The embodiments of the present invention relate to multilayer thermoplastic structures having improved sealability and tearability. More specifically, the present invention relates to a multilayer heat sealant structure having at least three layers that may be coextrusion coated or otherwise laminated to a substrate, such as metallized polymeric material, foil, or other substrates.

10 Claims, 2 Drawing Sheets

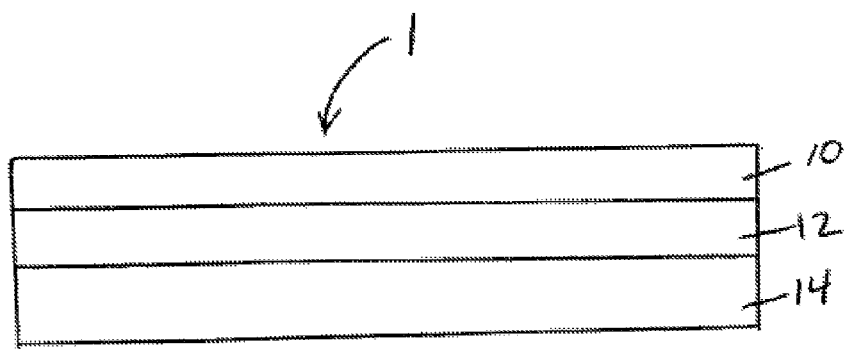
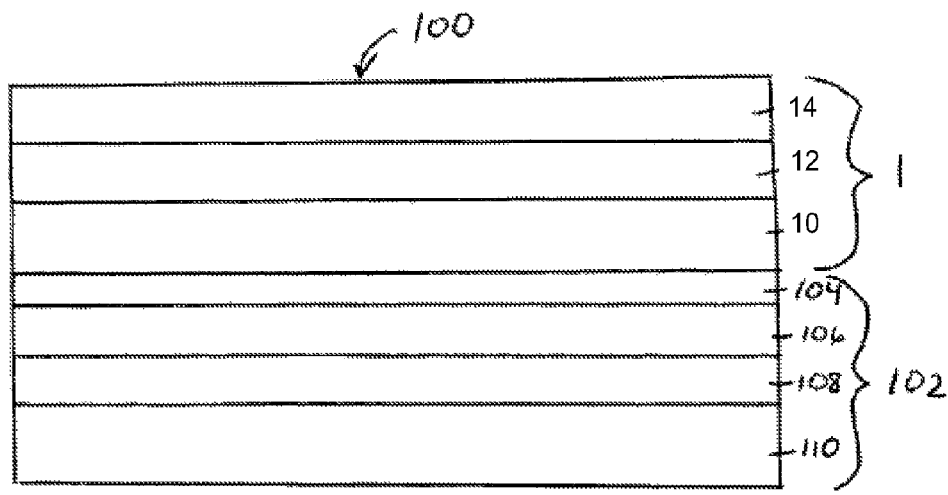

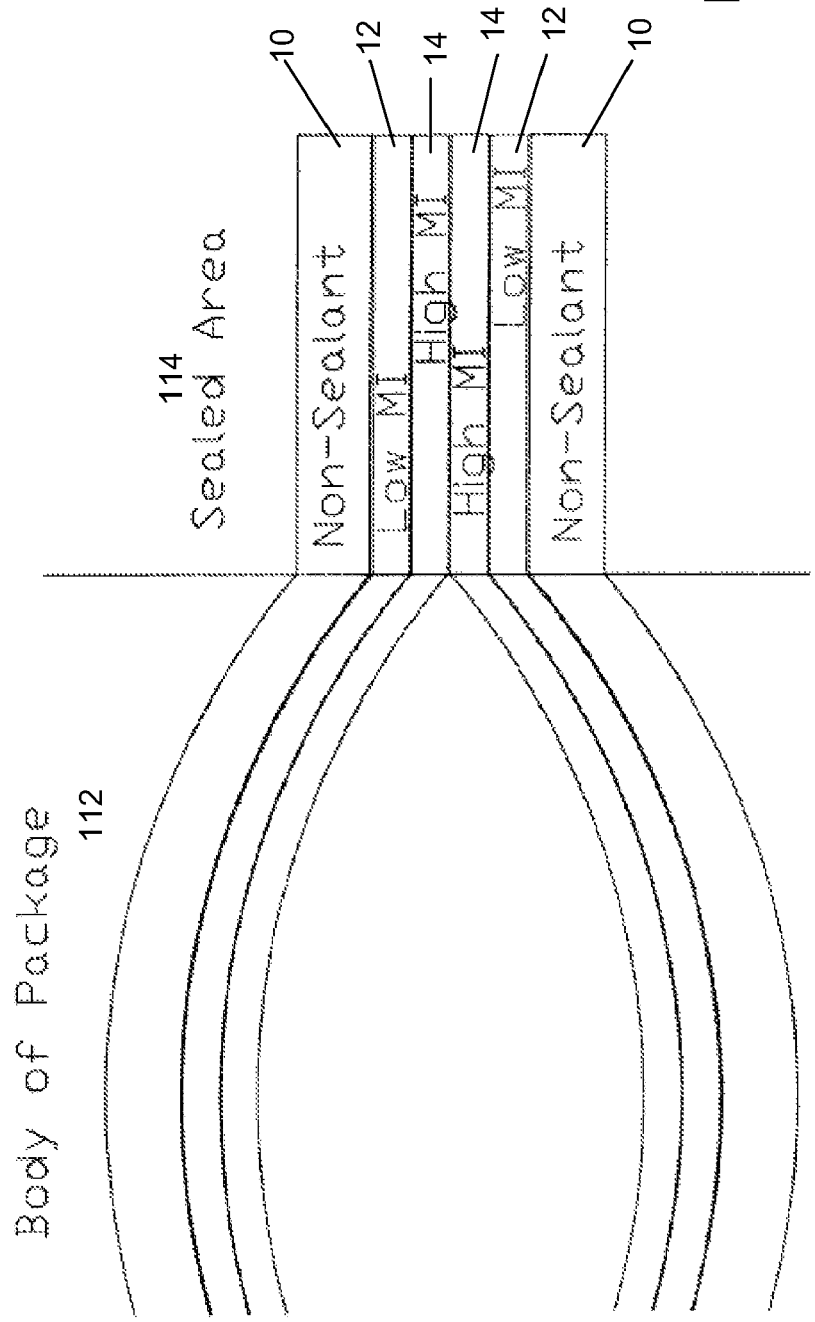

MULTILAYER HEAT SEALANT STRUCTURES, PACKAGES AND METHODS OF MAKING THE SAME

This application is a continuation-in-part of prior application Ser. No. 10/664,491, filed on Sep. 17, 2003, which is hereby incorporated by reference it its entirety.

TECHNICAL FIELD

Coextruded multilayer structures having improved sealability are provided. More specifically, the coextruded multilayer structures comprise at least three layers wherein a first layer comprises a first thermoplastic polymeric material, a second layer comprises low density polyethylene coextruded with and disposed adjacent to the first layer, and a third layer comprises a single site catalyzed polyethylene, wherein said third layer is coextruded with the first and second layers and further is disposed adjacent to the second layer. The coextruded heat sealant structures may be laminated to one or more substrates. Moreover, the coextruded heat sealant structures may be heat sealed to another coextruded heat sealant structure to form packages forming a space for a product therein. The structures of the present invention may be particularly useful for flowable products, such as, for example, condiments including, but not limited to, catsup, mustard, mayonnaise and the like.

BACKGROUND

It is generally known to provide multilayer structures that may be utilized as heat sealant structures to form packages for products, such as, for example, flowable products. Many multilayer structures are known having a variety of properties, such as heat sealability, flowability, and the like.

Packages for enclosing products are typically made by forming a thermoplastic polymeric structure into a shape to accommodate the product, placing another thermoplastic polymeric structure over the product and then heat sealing the structures together to maintain the product within the two structures. Packages for products may also be made by forming a thermoplastic polymeric structure into a pouch, or otherwise folding a thermoplastic polymeric structure over itself, filling the structure with a product, and then heat sealing the structure closed. The packages made from the above, however, can have problems in their heat-sealing and tearability properties. These issues are especially problematic if the package, containing a flowable product, is intended to be opened by a consumer wherein a combination of good seal and good tear properties are desired and necessary.

Certain products, such as, for example, condiments, require thermoplastic multilayer structures to form relatively small packages. For example, it is well known that catsup, mustard and other like condiments are packaged in individual serving sizes, especially at fast-food restaurants or the like.

Typical packages for flowable products, such as condiments, have walls made from multilayer thermoplastic structures that are not typically easily torn, such that the product may not be easily retrieved or otherwise utilized from the package. Therefore, packages may be difficult to open by young children, the aged or infirm, and other like individuals having reduced ability to cause the structures to tear. The walls of a package for flowable products, such as, for example, condiments or the like, should be easily tearable without also causing the product to be spilled or otherwise lost.

Moreover, typical packages for flowable products, such as, for example, condiments and/or wrinkles or the like, do not provide good seals when heat sealed because of contaminants and/or wrinkles that may be present within the heat seal zone. Typically, condiment packaging is made by a known process called vertical form, fill and seal (VFFS), which comprises bringing together two thermoplastic polymeric structures in face-to-face contact and wrapping the structures around product filling tubes. The structures are heat sealed on opposite sides of the product filling tubes in the machine direction to form side seals of the condiment packages. A heat seal is then placed across the structures in the transverse direction of the thermoplastic structures below the product filling tubes to form a pouch. Product is then delivered into the individual pouches and the delivery tubes are then extracted from the pouches. A final heat seal is disposed to seal the tops of the individual pouches. Heat seals, however, typically require heat seal zones free of contaminants and/or wrinkles to prevent weak heat seals from forming. Weak heat seals can cause a loss of a flowable product since a flowable product contained in packages having weak heat seals may spill from the packages if the heat seals break or otherwise delaminate. Moreover, packages having weak heat seals may lose their oxygen or moisture barrier characteristics.

Typically, to increase the sealability of packages for flowable products, a high melt flow thermoplastic material is used as the heat sealant layer. However, high melt flow materials tend to increase the tear resistance of the packages, thereby making it more difficult to open by using tearing forces.

A need, therefore, exists for a multilayer heat sealant structure having improved tearability, while also being easily heat sealed, even in the presence of contaminants and/or wrinkles. Moreover, a need exists for packages made from the multilayer heat sealant structure to contain flowable products therein, such as, for example, condiments and the like. In addition, a need exists for structures, packages and methods of making the same that solve the problems associated with prior art structures and packages for flowable products, such as, for example, condiments or the like.

SUMMARY OF THE INVENTION

The embodiments of the present invention relate to multilayer thermoplastic structures having improved sealability and tearability. More specifically, the present invention relates to a multilayer heat sealant structure having at least three layers that may be coextrusion coated or otherwise laminated to a substrate, such as metallized polymeric material, foil, or other substrates.

To this end, in an embodiment of the present invention, A multilayer structure is provided comprising a coextruded multilayer heat sealant structure comprising a first layer comprising a thermoplastic polymeric material, a second layer comprising low density polyethylene disposed adjacent to and coextruded with the first layer, and a third layer comprising a single site catalyzed polyethylene for use as a heat sealant layer wherein the third layer is disposed adjacent to the second layer and further wherein the third layer is coextruded with the first and second layers. The coextruded multilayer heat sealant structure may be laminated to one or more substrates. One of the plurality of substrates may comprise a metallized layer wherein the first layer of the coextruded multilayer heat sealant structure is adhered to the metallized layer. The coextruded multilayer heat sealant structure may be laminated to another coextruded multilayer heat sealant structure.

Moreover, the first layer of the multilayer structure may comprise ethylene acrylic acid copolymer, the second layer may comprise a blend of low density polyethylene and high density polyethylene, and the third layer may comprise metallocene-based single site catalyzed polyethylene. Specifically, the third layer may comprise a blend of the single site catalyzed polyethylene and low density polyethylene.

In addition, the coextruded multilayer heat sealant structure may be coextrusion coated to the substrate. Moreover, the coextruded multilayer heat sealant structure may be made by blown coextrusion.

The single site catalyzed polyethylene may preferably have a density of about 0.912 g/cc and a melt index of about 12 g/10 min at 190° C. Alternatively, the single site catalyzed polyethylene may have a density of about 0.910 g/cc and a melt index of about 15 g/10 min. at 190° C.

In an alternate embodiment of the present invention, a package for a product comprises a first multilayer structure comprising a coextruded multilayer heat sealant structure comprising a first layer comprising a thermoplastic polymeric material, a second layer comprising low density polyethylene disposed adjacent to and coextruded with the first layer, and a third layer comprising a single site catalyzed polyethylene for use as a heat sealant layer. The third layer is disposed adjacent to the second layer and is coextruded with the first and second layers. A second multilayer structure is heat sealed to the first multilayer structure to form the package with a space therein for the product. The coextruded multilayer heat sealant structure may be laminated to a substrate. The substrate may comprise a metallized layer wherein the first layer is laminated to the metallized layer.

Moreover, the first layer of the coextruded multilayer heat sealant structure of the package of the present invention may comprise ethylene acrylic acid copolymer, the second layer may comprise a blend of low density polyethylene and high density polyethylene, and the third layer may comprise metallocene-based single site catalyzed polyethylene. More specifically, the third layer may comprise a blend of the single site catalyzed polyethylene and low density polyethylene.

In addition, the coextruded multilayer heat sealant structure of the package may be coextrusion coated to the substrate. Moreover, the coextruded multilayer heat sealant structure may be made by blown coextrusion. Further, the second multilayer structure may be identical to the first multilayer structure.

Still further, the single site catalyzed polyethylene of the third layer of the heat sealant structure of the package of the present embodiment may have a density of about 0.912 g/cc and a melt index of about 12 g/10 min. at 190° C. Alternatively, the single site catalyzed polyethylene may have a density of about 0.910 g/cc and a melt index of about 15 g/10 min. at 190° C.

In another alternate embodiment of the present invention, a method of making a multilayer structure is provided comprising the steps of coextruding a multilayer heat sealant structure comprising a first layer comprising a thermoplastic polymeric material, a second layer comprising low density polyethylene wherein the second layer is disposed adjacent to the first layer, and a third layer comprising a single site catalyzed polyethylene wherein the third layer is disposed adjacent to the second layer, and laminating said first layer of said multilayer sealant structure to a substrate.

Preferably, the substrate comprises a metallized layer, the first layer comprises ethylene acrylic acid copolymer, the second layer comprises a blend of the low density polyethylene and a high density polyethylene, and the third layer comprises a blend of the single site catalyzed polyethylene and low density polyethylene.

In addition, the multilayer heat sealant structure made by the method of the present invention may be made via blown coextrusion. Moreover, the multilayer heat sealant structure made by the method of the present invention may be coextrusion coated to the substrate. Further, the single site catalyzed polyethylene may have a density of about 0.912 g/cc and a melt index of about 12 g/10 min. at 190° C. Alternatively, the single site catalyzed polyethylene may have a density of about 0.910 g/cc and a melt index of about 15 g/10 min. at 190° C.

It is, therefore, an advantage of the present to provide a heat sealable thermoplastic structure that is easily torn and further is easily heat sealed through contaminants and/or wrinkles. Moreover, it is an advantage of the present invention to provide a heat sealable thermoplastic structure that is laminated to one or more substrates to provide abuse protections, printability, oxygen and moisture barrier properties, and other like characteristics. Additional features and advantages of the present invention are described in, and will be apparent from, the detailed description of the presently preferred embodiments and from the drawings.

BRIEF DESCRIPTION OF THE DRAWINGS

FIG. 1 illustrates a cross section of a multilayer heat sealant structure of the present invention in an embodiment of the present invention.

FIG. 2 illustrates a cross-section of a multilayer structure of a heat sealant structure adhered to a plurality of substrates in an alternate embodiment of the present invention.

FIG. 3 illustrates an exemplary package with polymeric structures placed in a face-to-face relationship.

DETAILED DESCRIPTION OF THE INVENTION

Coextruded multilayer structures, packages made therefrom, and methods of making the same are provided. More specifically, the coextruded multilayer structures comprise heat sealant structures comprising at least three layers wherein a first layer comprises a first thermoplastic polymeric material, a second layer comprises low density polyethylene coextruded with and disposed adjacent to the first layer, and a third layer comprises a single site catalyzed polyethylene, which is coextruded with the first and second layers and further is disposed adjacent to the second layer. The coextruded heat sealant structures of the present invention may be laminated to substrates. Moreover, the coextruded heat sealant structures may be heat sealed to other structures to form packages forming spaces therein for products. The structures of the present invention may be particularly useful for flowable products, such as, for example, condiments including, but not limited to, catsup, mustard, mayonnaise and the like.

Referring now to the figures, wherein like numerals refer to like parts, FIG. 1 illustrates a cross-sectional view of a multilayer heat sealant structure 1 of the present invention. The multilayer heat sealant structure 1 may comprise a first layer 10, a second layer 12 and a third layer 14. The first layer 10 may comprise a thermoplastic polymeric material, preferably useful for laminating to substrates, as shown below with reference to FIG. 2. Preferably, the first layer 10 may comprise a thermoplastic polymeric material selected from the group consisting of ethylene acrylic acid copolymer, ethylene methyl acrylate copolymer, ethylene vinyl acetate copolymer, ethylene ethyl acrylate copolymer, ethylene methyl acrylic acid copolymer, and blends thereof. Most preferably, the first layer 10 is selected from a thermoplastic polymeric material that bonds well to foil or other metallized layers.

The second layer 12 of the multilayer heat sealant structure 1 may comprise a thermoplastic polymeric material that provides increased stiffness to the multilayer heat sealant structure 1 of the present invention. Moreover, the second layer 12 may comprise a thermoplastic polymeric material that has a relatively high melting temperature, relative to the heat sealant layer 14, described below. The thermoplastic polymeric material of the second layer 12 thereby enhances the burst strength of packages made from the multilayer heat sealant structure 1 and improves wrinkles that may form during the making of the multilayer heat sealant structure 1. Moreover, the thermoplastic polymeric material of the second layer may have a relatively low melt index, especially relative to the material utilized in the heat sealant layer, as described below. Low melt index materials are useful to prevent sealant squeeze-out during heat sealing, or caulking, of the heat sealant layer. Preferably, the thermoplastic polymeric material forming the second layer 12 may be low density polyethylene or a blend of low density polyethylene and high density polyethylene.

The third heat sealant layer 14 allows the multilayer heat sealant structure 1 to be heat-sealed to itself or to other similar film structures. Typically, polymeric structures are placed in face-to-face relationship with each other, and a heat-sealing bar fuses the two polymeric structures together to form a package 112. FIG. 3 illustrates the face-to-face relationship of polymeric structures. The arrangement of a first multilayer heat sealant structure comprising a low melt index layer 12 (second layer) adjacent to a high melt index layer 14 (third layer) abutting a second multilayer heat sealant structure comprising a low melt index layer 12 adjacent to a high melt index layer 14 provides a unique and superior combination of materials within a sealant surface.

In one aspect, the high melt index layer 14 of the first multilayer heat sealant structure abut the high melt index layer 14 of the second multilayer heat sealant structure. In another aspect, at least a portion of the first multilayer heat sealant structure is heat sealed to at least a portion of the second multilayer heat sealant structure creating a sealed area 114. In another aspect, the portion is an edge. In another aspect, at least three edges are heat sealed to form a package such as a bag. Such bags are typically rectangular in shape.

The third heat sealant layer 14 may be made from polyethylene having a relatively low melt temperature and a relatively high melt index, such as, for example, above about 10 g/10 min, thereby enabling the heat sealant structure 1 to easily flow when melted and fuse when frozen. By utilizing a material having a relatively high melt index, heat seals may be created that are relatively strong, especially if product contaminates the heat seal area on the first structure or if wrinkles are present in the heat seal area. Preferably, the third heat sealant layer 14 comprises a thermoplastic polymeric material that provides high flow rates, good hot tack, lower seal activation and can easily seal, or caulk, through any product, irregularities, or wrinkles that may contaminate the seal area of multilayer sealant structure 1. Single site catalyzed polyethylenes are ideal polymeric thermoplastic materials to provide high melt indexes with relatively low melt temperatures.

Preferably, the heat sealant materials utilized in the third heat sealant layer 14 are single site catalyzed polyethylenes or blends of single site catalyzed polyethylenes with low density polyethylene. More preferably, the single site catalyzed polyethylene utilized in the third heat sealant layer 14 is Exxon single site catalyzed polyethylene having a density of about 0.912 g/cc and a melt index of about 12 g/10 min. at 190° C., measured by ASTM D-1238. Most preferably, the single site catalyzed polyethylene utilized in the third heat sealant layer 14 is DOW INSITE™. single site catalyzed polyethylene technology, having a density of about 0.910 g/cc and a melt index of about 15 g/10 min. at 190° C., measured by ASTM D-1238.

Although the third heat sealant layer comprises a thermoplastic polymeric material having a very high melt index, this material may be coextruded via blown film coextrusion without difficulty because it is disposed adjacent to the low melt index thermoplastic polymeric material of the second layer. The high melt index thermoplastic polymeric material may, therefore, maintain its stability during the blown film coextrusion process. Without the low melt index thermoplastic polymeric material of the second layer 12, the high melt index material of the third heat sealant layer would not adequately coextrude via blown film coextrusion. The unique combination of a thin high melt index polymer adjacent to a low melt index layer allows a much higher melt index to be used than typical for blown films providing sealing, or caulking, characteristics.

Alternatively, the three layers of the multilayer heat sealant structure 1 may be made in a two-step coextrusion whereby a first multilayer structure comprising the first layer 10 and the second layer 12 is laminated to a second multilayer structure comprising the second layer 12 and the third heat sealant layer 14. When joined together in this process, the multilayer heat sealant structure 1 is created having the first layer 10, the second layer 12 and the third layer 14.

FIG. 2 illustrates a multilayer structure 100 comprising the heat sealant structure 1, described above with reference to FIG. 1, laminated to a substrate 102. The substrate 102 may be any material useful to add desired properties to the multilayer structure when utilized in a package. For example, the substrate may provide barrier protection. Further, the substrates are easily tearable without affecting the sealability of the heat sealant structure 1. For example, the substrate 102 may comprise a foil layer 104 or other metallized layers that is laminated directly adjacent to the first layer 10 comprising the thermoplastic polymeric material described above, such as, for example, ethylene acrylic acid copolymer.

Laminated to the foil layer 104 may be further thermoplastic layers 106, 108 which may be utilized to provide structure or color to the multilayer structure 100. For example, the thermoplastic layers 106, 108 may comprise low density polyethylene. One or both of the layers 106, 108 may comprise a colorant thereby providing the multilayer structure 100 with color. In addition, an outer abuse layer 110 may be provided comprising a thermoplastic polymeric material useful for protecting the multilayer structure 100, such as, for example, polyethylene terephthalate (PET), or other like thermoplastic polymeric material. Moreover, any of these layers may be printed prior to adding to the multilayer structure 100.

The following are non-limiting examples of the present invention:

Example 1

| Structure Layer | Material | Percentage of Sealant Structure | Melt Index (g/10 min) |
| --- | --- | --- | --- |
| First | 100% EAA | 13.9% | 10.5 |
| Second | 70% LDPE | 55.6% | 9.29 |

-continued

| Structure Layer | Material | Percentage of Sealant Structure | Melt Index (g/10 min) |
|---|---|---|---|
| Third Heat Sealant | 30% HDPE 100% mLLDPE | 30.5% | 15.0 |

Example 2

| Structure Layer | Material | Percentage of Sealant Structure | Melt Index (g/10 min) |
|---|---|---|---|
| First | 100% EAA | 16.7% | 10.5 |
| Second | 70% LDPE 30% HDPE | 46.7% | 9.29 |
| Third Heat Sealant | 100% mLLDPE | 36.7% | 15.0 |

Example 3

| Structure Layer | Material | Percentage of Sealant Structure | Melt Index (g/10 min) |
|---|---|---|---|
| First | 100% EAA | 16.7% | 10.5 |
| Second | 100% LDPE | 46.7% | 7.0 |
| Third Heat Sealant | 100% mLLDPE | 36.7% | 15.0 |

Each of these examples shows three layer heat sealant structures. Each of these heat sealant structures were extrusion coated onto aluminum foil, resulting in multilayer structures comprising OPP or PET//Polyolefin//foil//first layer 10/second layer 12/third heat sealant layer 14.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A multilayer structure comprising first and second multilayer heat sealant structures, each of the first and second multilayer structures comprising:

a coextruded multilayer heat sealant structure comprising a low melt index layer comprising low density polyethylene and a high melt index layer comprising a single site catalyzed polyethylene wherein said single site catalyzed polyethylene has a melt index above about 10 g/10 min for use as a heat sealant layer wherein the high melt index layer is disposed adjacent to the low melt index layer, and further wherein the high melt index layer is coextruded with the low melt index layer and further wherein said low density polyethylene of the low melt index layer has a melt index lower than a melt index of the single site catalyzed polyethylene of the high melt index layer; and wherein at least a portion of the first multilayer heat sealant structure is sealed to at least a portion of the second multilayer heat sealant structure such that the high melt index layers of the first and second multilayer heat sealant structures abut each other.

2. The multilayer structure of claim 1 wherein each of the first and second multilayer heat sealant structures comprise at least one edge, and wherein the at least one edges of the first and second multilayer heat sealant structures are heat sealed.

3. The multilayer structure of claim 1 wherein the low melt index layer comprises a blend of low density polyethylene and high density polyethylene.

4. The multilayer structure of claim 1 wherein the high melt index layer comprises metallocene-based single site catalyzed polyethylene.

5. The multilayer structure of claim 1 wherein the high melt index layer comprises a blend of the single site catalyzed polyethylene and low density polyethylene.

6. The multilayer structure of claim 1 wherein the single site catalyzed polyethylene has a density of about 0.912 g/cc and a melt index of about 12 g/10 min at 190° C.

7. The multilayer structure of claim 1 wherein the single site catalyzed polyethylene has a density of about 0.910 g/cc and a melt index of about 15 g/10 min. at 190° C.

8. The multilayer structure of claim 1 wherein the at least a portion of the first multilayer structure is heat sealed to the at least a portion of the second multilayer structure.

9. The multilayer structure of claim 1 wherein each of the first and second multilayer heat sealant structures further comprise a first layer comprising a thermoplastic polymeric material, wherein said low melt index layer is disposed adjacent to and coextruded with the first layer.

10. The multilayer structure of claim 9 wherein said thermoplastic polymeric material of the first layer comprises ethylene acrylic acid copolymer.

* * * * *